US007575269B2

(12) United States Patent
Kobayashi et al.

(10) Patent No.: US 7,575,269 B2
(45) Date of Patent: Aug. 18, 2009

(54) CONNECTOR CONNECTING CONSTRUCTION, A CLAMPING MEMBER AND A METHOD OF MOUNTING A CONNECTOR CONNECTING CONSTRUCTION

(75) Inventors: Tomohiko Kobayashi, Yokkaichi (JP); Tomoyuki Funayama, Toyota (JP); Tomoo Kakegawa, Toyota (JP); Shigeki Nishiyama, Toyota (JP); Hiroshi Kobayashi, Okazaki (JP)

(73) Assignee: Sumitomo Wiring Systems, Ltd. (JP)

( * ) Notice: Subject to any disclaimer, the term of this patent is extended or adjusted under 35 U.S.C. 154(b) by 283 days.

(21) Appl. No.: 11/728,481

(22) Filed: Mar. 26, 2007

(65) Prior Publication Data

US 2007/0228768 A1 Oct. 4, 2007

(30) Foreign Application Priority Data

Mar. 29, 2006 (JP) ............................ 2006-092106

(51) Int. Cl.
*B60J 7/00* (2006.01)
*H01R 33/00* (2006.01)

(52) U.S. Cl. ...................... 296/146.1; 439/34; 439/466

(58) Field of Classification Search ............. 296/146.1; 439/34, 466, 473
See application file for complete search history.

(56) References Cited

U.S. PATENT DOCUMENTS

| | | | | |
|---|---|---|---|---|
| 6,033,251 | A | 3/2000 | Cook | |
| 7,057,124 | B2 | 6/2006 | Ieda et al. | |
| 7,402,043 | B2 * | 7/2008 | Komiyama et al. | 439/34 |
| 2005/0050842 | A1 | 3/2005 | Komiyama et al. | |

FOREIGN PATENT DOCUMENTS

| | | | |
|---|---|---|---|
| DE | 3625119 | A1 | 1/1988 |
| DE | 19830635 | C1 | 4/2000 |
| EP | 1 031 683 | A1 | 8/2000 |
| EP | 1 437 461 | A2 | 6/2004 |
| FR | 2 816 121 | | 5/2002 |
| GB | 2 183 405 | | 6/1987 |
| JP | 2004-176343 | | 7/2004 |

* cited by examiner

*Primary Examiner*—Joseph D Pape
(74) *Attorney, Agent, or Firm*—Gerald E. Hespos; Anthony J. Casella

(57) ABSTRACT

A door handle device (S) has a handle-side connector (30) fixed to a door handle (10) that is hinged to a handle frame (20). Thus, the door handle device (S) is displaceable as the door handle (10) is turned. A frame-side connector (40) is located in the handle frame (20) and is connectable with the handle-side connector (30) for displacement with the handle-side connector (30) as the door handle (10) is turned. A clamp (60) has a wire retaining portion (61) for retaining a wire group (80) drawn out through an end surface of the frame-side connector (40) and a handle attaching portion (62) continuous with the wire retaining portion (61) for attachment to the door handle (10). Thus, a relative position of the wire retaining portion (61) to the door handle (10) is invariable.

10 Claims, 9 Drawing Sheets

CONNECTOR CONNECTING CONSTRUCTION, A CLAMPING MEMBER AND A METHOD OF MOUNTING A CONNECTOR CONNECTING CONSTRUCTION

BACKGROUND OF THE INVENTION

1. Field of the Invention

The invention relates to a connector connecting construction arranged at a door handle and a handle frame and a clamp for retaining wires drawn out from a frame-side connector. The invention further relates to a method of mounting a connector connecting construction.

2. Description of the Related Art

Systems have been developed to improve convenience in opening and closing automotive doors. These systems have electric parts built in the door handles and handle frames. For example, U.S. Patent Application Publication No. US 2005/0050842 has a handle-side connector mounted in a door handle and a frame-side connector held in a handle frame. An end of the door handle is hinged to the handle frame and the door handle is turned about the hinge. The two connected connectors are displaced together as the door handle is turned.

The frame-side connector is connected with an end of a wire group that extends from the interior of a vehicle while being separated from the door handle. The frame-side connector can be pulled inside by the wire group and cannot easily move towards the door handle. Therefore, the frame-side connector cannot flexibly follow the displacement of the handle-side connector when the door handle is turned. As a result, stresses act on the connecting surfaces of both connectors in directions of displacement, and these stresses can affect connected parts of terminal fittings in both connectors.

The invention was developed in view of the above situation, and an object thereof is to enable a frame-side connector to be smoothly displaced when a door handle is turned.

SUMMARY OF THE INVENTION

The invention relates to a connector connecting construction that has a handle-side connector and a fame-side connector. The handle-side connector is to be fixed to a door handle pivotally hinged to a handle frame. The handle-side connector is displaceable as the door handle is operated. The frame-side connector is to be located at the handle frame and is connectable with the handle-side connector. Additionally, the frame-side connector is displaceable together with the handle-side connector in its connected state as the door handle is turned. At least one clamp including at least one wire retaining portion is provided for retaining a wire group drawn out through an end surface of the frame-side connector. At least one handle attaching portion is substantially continuous with the wire retaining portion and is attachable to the door handle to make a relative position of the wire retaining portion to the door handle substantially invariable.

The handle-side connector and the frame-side connector are connected to one another and are displaced together as the door handle is operated. The wire group drawn out through the end surface of the frame-side connector is retained by the wire retaining portion of the clamp, and the handle attaching portion of the clamp is attached to the door handle to make the position of the wire retaining portion relative to the door handle substantially invariable. Thus, operation of the door handle does not impose unnecessary stress on the wire retaining portion from the end surface of the frame-side connector. As a result, stress on the connecting surfaces of the two connectors in directions of displacement is suppressed to guarantee smooth displacements of the two connectors as the door handle is operated.

An elevating surface of a door glass preferably is at a side of the frame-side connector substantially opposite to the door handle. However, this arrangement permits the wire group drawn out through the end surface of the frame-side connector to interfere with the door glass. Accordingly, the wire group preferably has an inclined portion arranged oblique to an elevating surface of a door glass so as to widen a clearance to the elevating surface of the door glass along a direction away from the end surface of the frame-side connector. Additionally, the wire retaining portion preferably includes at least one inclined guiding means for keeping the inclined posture of the inclined portion. Therefore, the interference of the wire group and the door glass can be avoided.

The end surface of the frame-side connector faces the elevating surface of the door glass. Additionally, the wire group is bent after being drawn out through the end surface of the frame-side connector. The inclined portion extends from the bend, and has an intermediate part bundled at a bundling position by at least one bundling means. The wire at an inner side of the bend could bulge out for length adjustment and could cause spatially accommodation problems. Accordingly, the wire at the inner side of the bend preferably is shorter between the end surface of the frame-side connector and the bundling position as compared to a wire located at an outer side of the bend. As a result, the wire group can have a compact configuration at the bend.

The clamp preferably has a connector attaching portion that is attachable to the frame-side connector. The wire retaining portion preferably is substantially in the form of a strip extending from the connector attaching portion. An extending direction of the wire group is defined by turning the wire retaining portion about the connector attaching portion with the wire group arranged along a plate surface of the wire retaining portion.

The invention also relates to a method of mounting a connector connecting construction. The method includes fixing a handle-side connector to a door handle pivotally hinged to a handle frame so as to be displaceable as the door handle is turned. The method then includes locating a frame-side connector at the handle frame so as to be connectable with the handle-side connector and so that the frame-side connector is displaceable together with the handle-side connector in its connected state as the door handle is turned. The method further includes retaining a wire group drawn out through or at an end surface of the frame-side connector by means of at least one wire retaining portion of at least one clamp, and attaching at least one handle attaching portion substantially continuous with the wire retaining portion to the door handle so as to make a relative position of the wire retaining portion to the door handle substantially invariable.

The method may further comprise arranging an inclined portion of the wire group oblique to an elevating surface of a door glass in such a manner as to widen a clearance to the elevating surface of the door glass along a direction away from the end surface of the frame-side connector.

The method may further comprise arranging the end surface of the frame-side connector to substantially face the elevating surface of the door glass, bending the wire group after being drawing out through the end surface of the frame-side connector so that the inclined portion extend from the bent position, and bundling an intermediate part thereof at a bundling position by at least one bundling means.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A connector connecting construction according to a first embodiment of the invention is illustrated in FIGS. 1 to 5 and is used in a vehicle door handle device S. The door handle device S is for a smart door-lock system and includes a door handle 10 and a handle frame 20. A handle-side connector 30 is provided at the door handle 10 and a frame-side connector 40 is provided at the handle frame 20.

Figure 1:
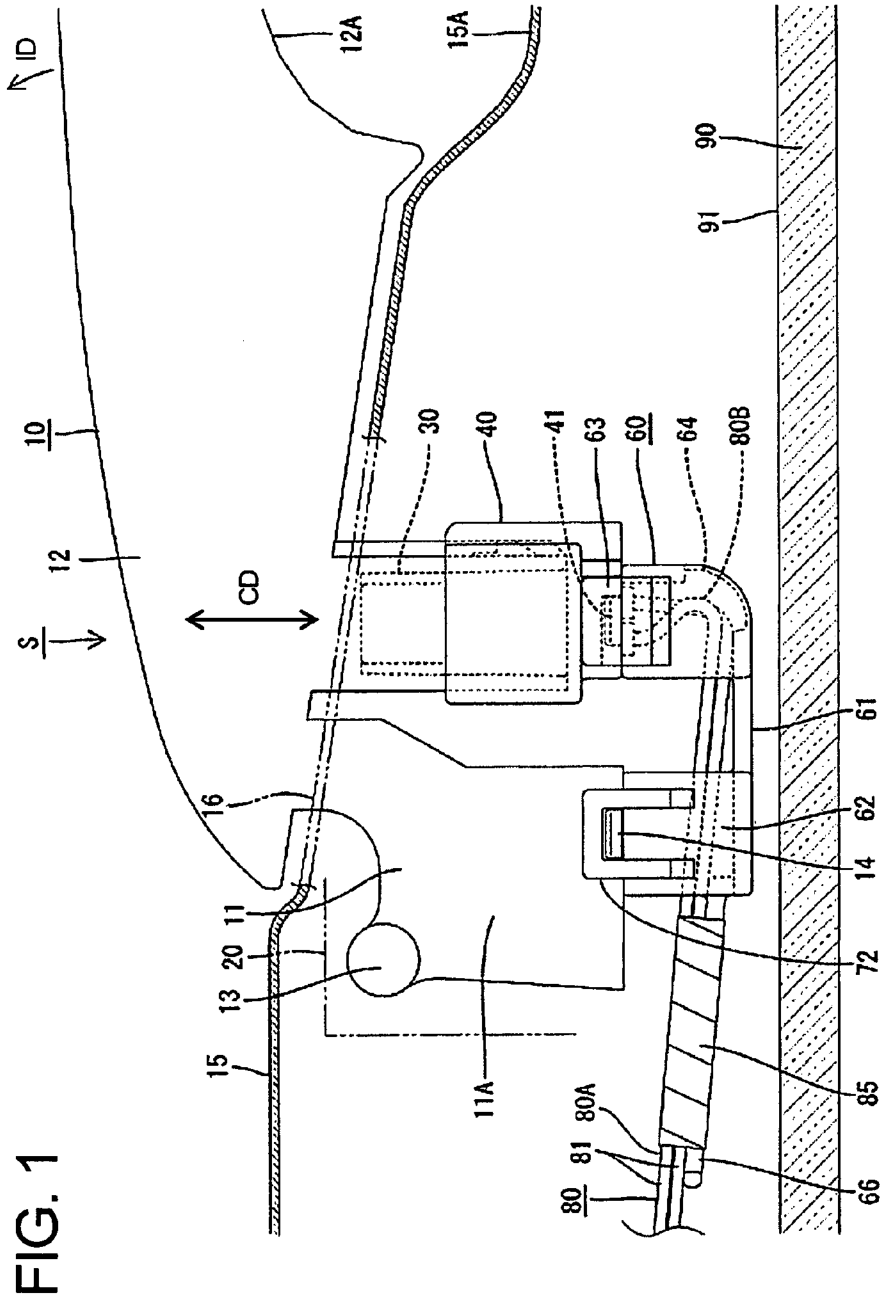
FIG. 1 is a side view of a connector connecting construction according to a first embodiment.

As shown in FIG. 1, the door handle 10 projects on the outer surface of a door panel 15 and has an arm-shaped fulcrum 11 and a main body 12 that extends back from the outer edge of the fulcrum 11. The main body 12 has a concave curved surface 12A separated from a concave surface 15A of the door panel 15 to define a region that can be gripped easily. Various electric parts (not shown) such as a sensor are provided in the handle main body 12. The handle-side connector 30 is supported at a position of the handle main body 12 near the fulcrum 11 and is connected electrically with the sensor and the like. The handle-side connector 30 moves integrally with the door handle 10.

The fulcrum 11 and the handle-side connector 30 are inserted through a handle insertion opening 16 in the door panel 15. A handle frame 20 is secured to the inner surface of the door panel 15, and the fulcrum 11 and the handle-side connector 30 are introduced into the handle frame 20. The fulcrum 11 includes a shaft 13 that engages a bearing (not shown) of the handle frame 20 so that the door handle 10 can pivot about the shaft 13 relative to the handle frame 20 in an inclination direction ID (arrow of FIG. 1) by pulling a rear part of the handle main body 12 away from the door panel 15.

The frame-side connector 40 is arranged pivotally at the handle frame 20 so that the connecting surface of the frame-side connector 40 faces the door handle 10 in conformity with the arranged position of the handle-side connector 30 when the connectors 30, 40 are connected. An elevating surface 91 of a door glass 90 is near the inner side of the handle frame 20 and hence is at a side of the handle frame 20 opposite the door handle 10. The elevating surface 91 of the door glass 90 is behind the connected frame-side connector 40 with respect to a connecting direction CD and near the frame-side connector 40. Terminal fittings (not shown) are accommodated in the frame-side connector 40 and are connected with an end of a wire group 80 that includes wires 81 extending from the door body. The terminal fittings connect with electric signal lines inside the vehicle via the wire group 80.

A clamp 60 engages the wire group 80 drawn out through the end surface of the frame-side connector 40. The clamp 60 includes a wire retainer 61 formed unitarily of synthetic resin and adapted to retain the wire group 80. A handle attaching portion 62 is continuous with the wire retainer 61 and is attachable to the door handle 10 when the wire group 80 is retained by the wire retainer 61. A connector attaching portion 63 of the clamp 60 is continuous with the wire retainer 61 and is attachable to the frame-side connector 40.

Figure 5:
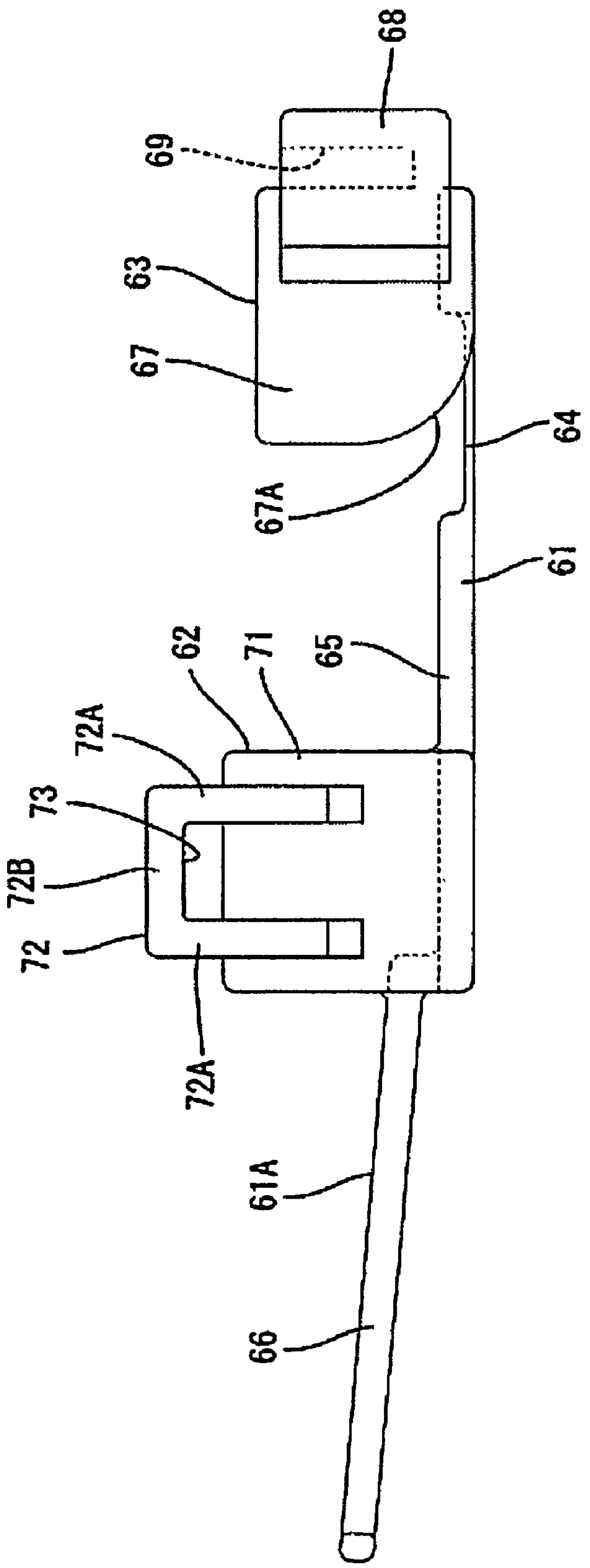
FIG. 5 is a side view of the clamp.
Figure 6:
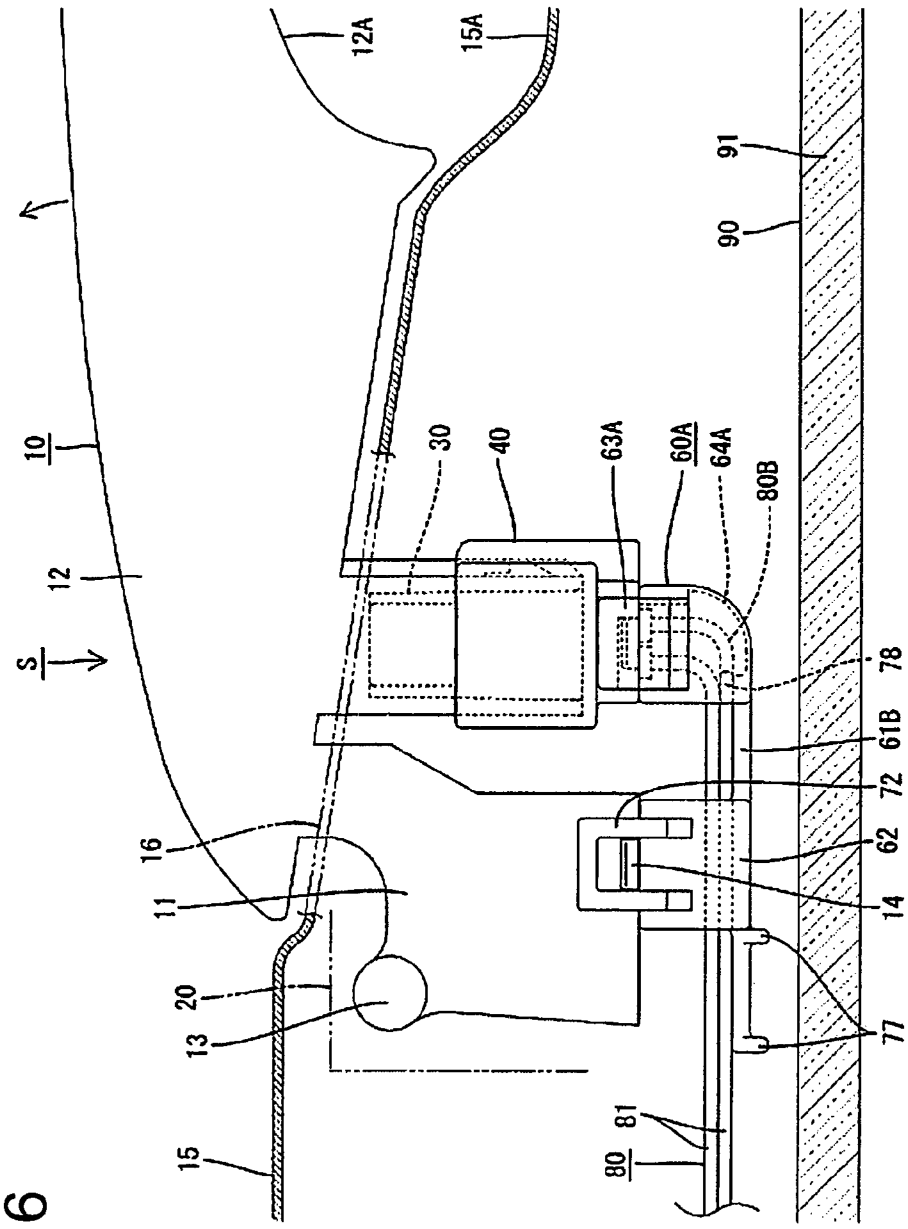
FIG. 6 is a side view of a connector connecting construction according to a second embodiment.
Figure 7:
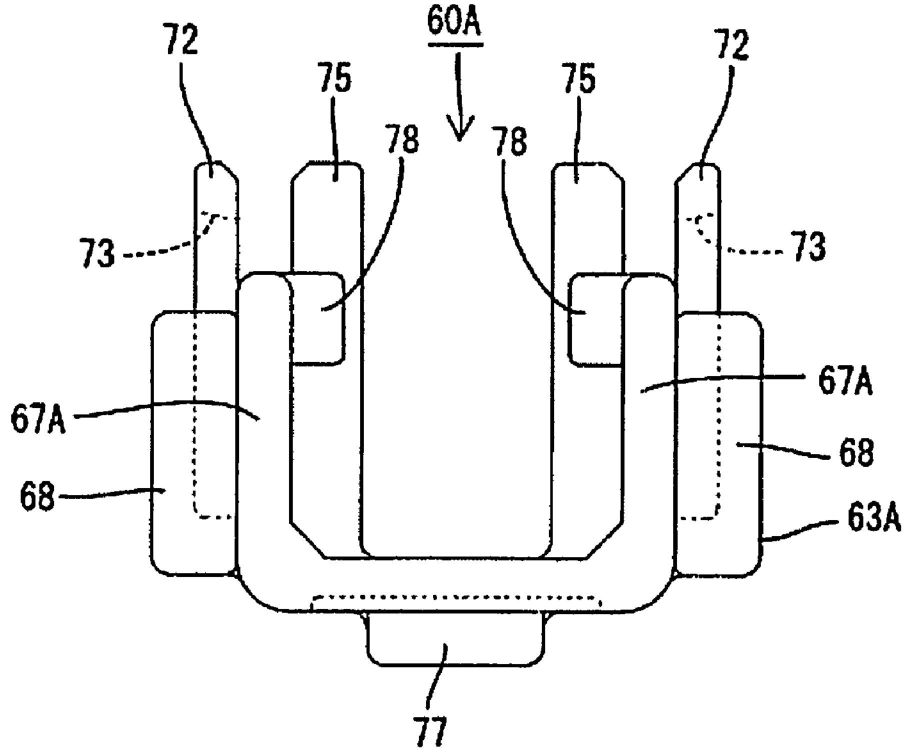
FIG. 7 is a rear view of a clamp.

As shown in FIG. 5, the wire retainer 61 is substantially band-shaped, and has a placing surface 61A (upper surface in FIG. 5) for the wire group 80. A hinge 64 is defined on the wire retainer 61 near the connector attaching portion 63 and is thinner than other areas of the wire retainer 61. The hinge 64 resiliently deforms into an arcuate shape if the wire retainer 61 is turned in a turning direction TD (arrow shown in FIG. 2) about the connector attaching portion 63 while the wire group 80 is on the placing surface 61A. As a result, the wire group 80 is bent forcibly near the end surface of the frame-side connector 40.

The wire retainer 61 has a base plate 65 and an inclined guide 66. The base plate 65 extends away from the connector attaching portion 63 and is substantially parallel with the elevating surface 91 of the door glass 90 before the hinge 64 is bent. The guide 66 is joined to the base plate 65 by a step so that the placing surface 61A of the wire retainer 61 has a slight upward offset from the base plate 65 to the guide 66. The guide 66 slopes up from the base plate 65 and is narrower than the base plate 65. The guide 66 gradually widens a clearance between the wire group 80 retained by the wire retaining portion 61 and the elevating surface 91 of the door glass 90. Thus, the wire group 80 initially extends from the end surface of the frame-side connector 40 towards the elevating surface 91 of the door glass 90. The wire group 80 then has a bend 80B at the hinge 64 and an inclined portion 80A on the guide 66. The guide 66 holds the inclined portion 80A in a substantially constant posture.

Figure 3:
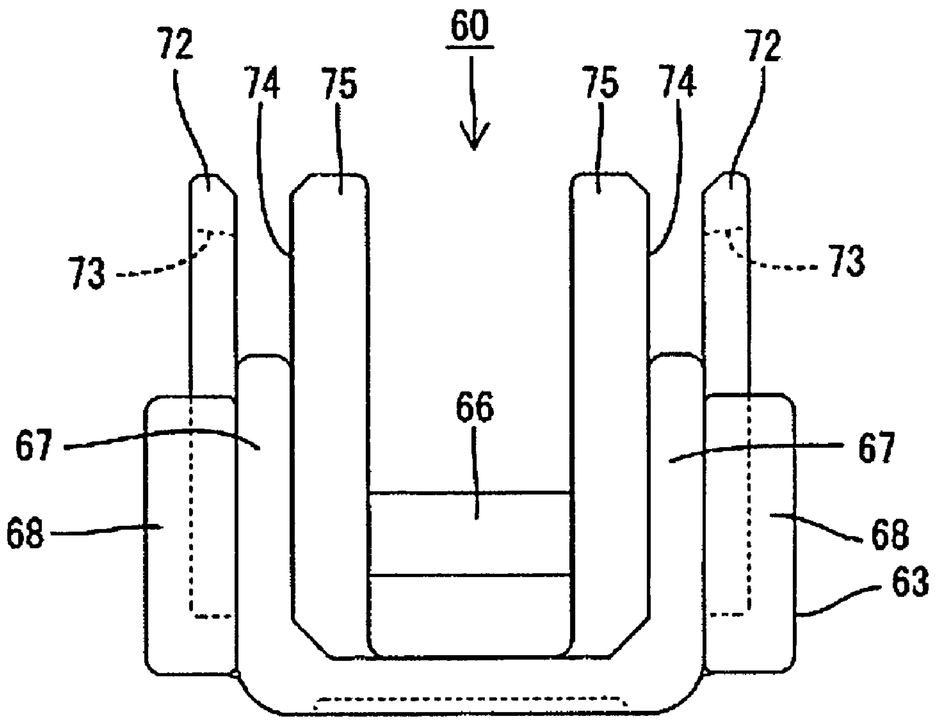
FIG. 3 is a rear view of the clamp.
Figure 4:
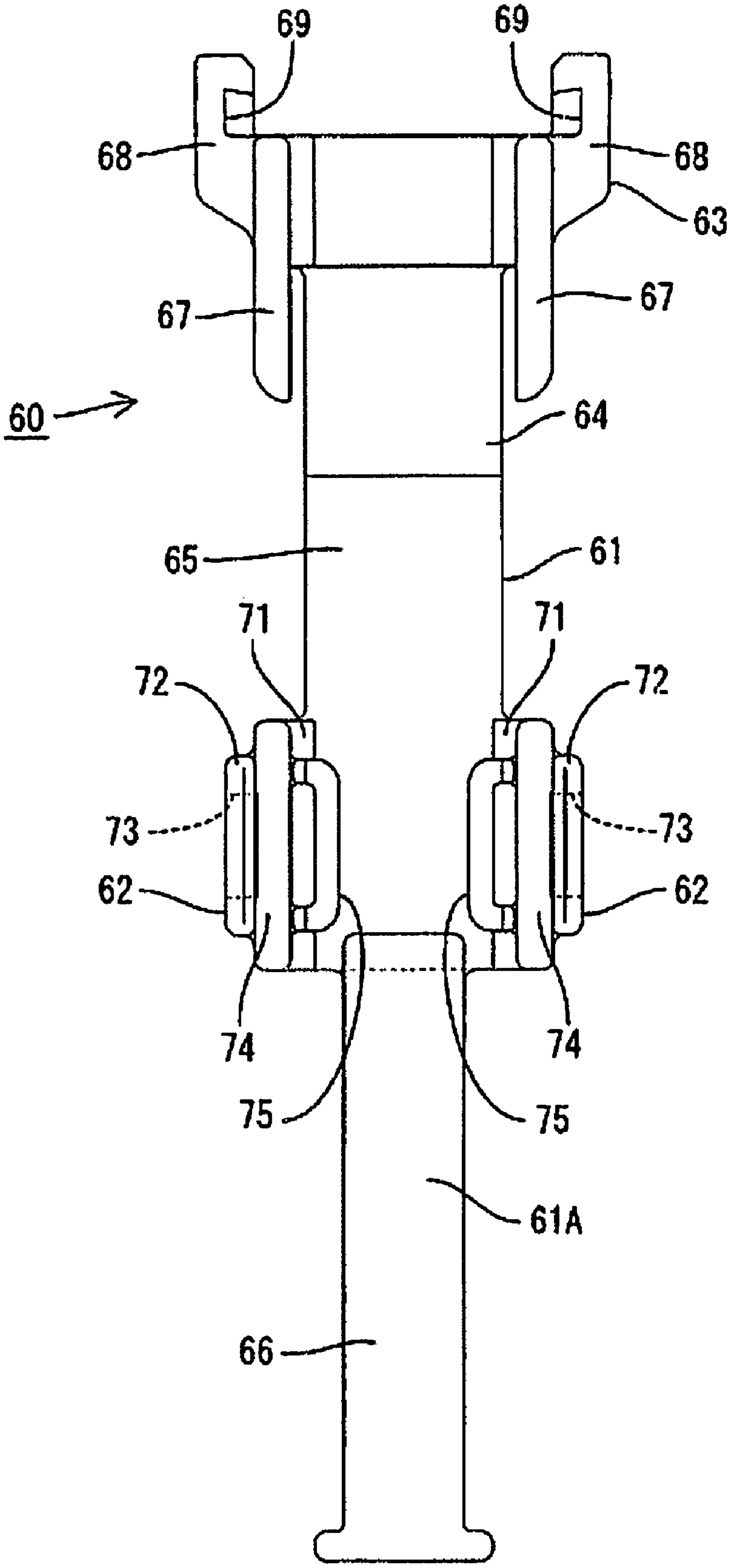
FIG. 4 is a plan view of the clamp.

As shown in FIGS. 3 and 4, the connector attaching portion 63 has opposed left and right draw-out guiding plates 67 that stand up from the opposite side edges of a rear end of the wire retaining portion 61 with respect to the extending direction. Connector attaching main bodies 68 are joined on the outer surfaces of the draw-out guiding plates 67. As shown in FIG. 5, each draw-out guiding plate 67 has an arcuate edge 67A defining a substantially quarter circular shape in side view. The arcuate edge 67A is arranged substantially along the corresponding side edge of the bent hinge 64 of the wire retainer 61. The draw-out guiding plates 67 are at the opposite lateral sides of the wire group 80 retained by the wire retainer 61 and hence restrict loose movements of the wire group 80 along the width direction.

The connector attaching main bodies 68 are thicker than the draw-out guiding plates 67 and include parts that project back beyond the rear ends of the draw-out guiding plates 67 with respect to the extending direction. Left and right mounting grooves 69 are formed in the facing surfaces of the backward projecting parts and extend along the rear ends of the draw-out guiding plates 67. The mounting grooves 69 open in the upper ends of the connector attaching main bodies 68 and are substantially transversely symmetrical with respect to the axial line of the wire retaining portion 61. Mounting ribs 41 are provided on end portions of the frame-side connector 40. The frame-side connector 40 is fit between the facing surfaces of the connector attaching main bodies 68 so that the mounting ribs 41 slide into the mounting grooves 69 through the openings in the upper end surfaces of the connector attaching main bodies 68. In this way, the clamp 60 is detachably attached to the frame-side connector 40.

The handle attaching portion 62 includes opposed left and right reinforcing plates 71 that project from opposite sides of an intermediate part of the wire retaining portion 61 between the base plate 65 and the inclined guide 66. Handle attaching main bodies 72 project sideways from outer surfaces of the reinforcing plates 71 and then extend up substantially parallel with the outer surfaces of the reinforcing plates 71. Left and right facing walls 75 are provided on the reinforcing plates 71. The facing walls 75 extend up to substantially the same position as the extending ends of the handle attaching main bodies 72 and face the corresponding handle attaching main bodies 72 while defining slits 74. The facing walls 75 are more towards the central axial line of the wire retaining portion 61 than the connector attaching main bodies 68.

Each handle attaching main body 72 has front and rear pieces 72A connected by a beam 72B to define a U-shape in side view with an engaging hole 73 defined inside the U-shape. Engaging projections 14 are provided on the fulcrum 11 of the door handle 10 at positions corresponding to the engaging holes 73. The handle attaching portions 62 are brought closer to the door handle 10 to insert frame plates 11A of the fulcrum 11 into the slits 74. Thus, the frame plates 11A are held between the handle attaching main bodies 72 and the facing walls 75. The handle attaching main bodies 72 move resiliently over the engaging projections 14 when the handle attaching portions 62 are pushed towards the door handle 10, and the engaging projections 14 fit into the engaging holes 73 to attach the handle attaching portions 62 to the door handle 10. In this attached state, end surfaces of the frame plates 11A rest on the bottom surfaces of the slits 74 to prevent the handle attaching portions 62 from being pushed farther.

Figure 2:
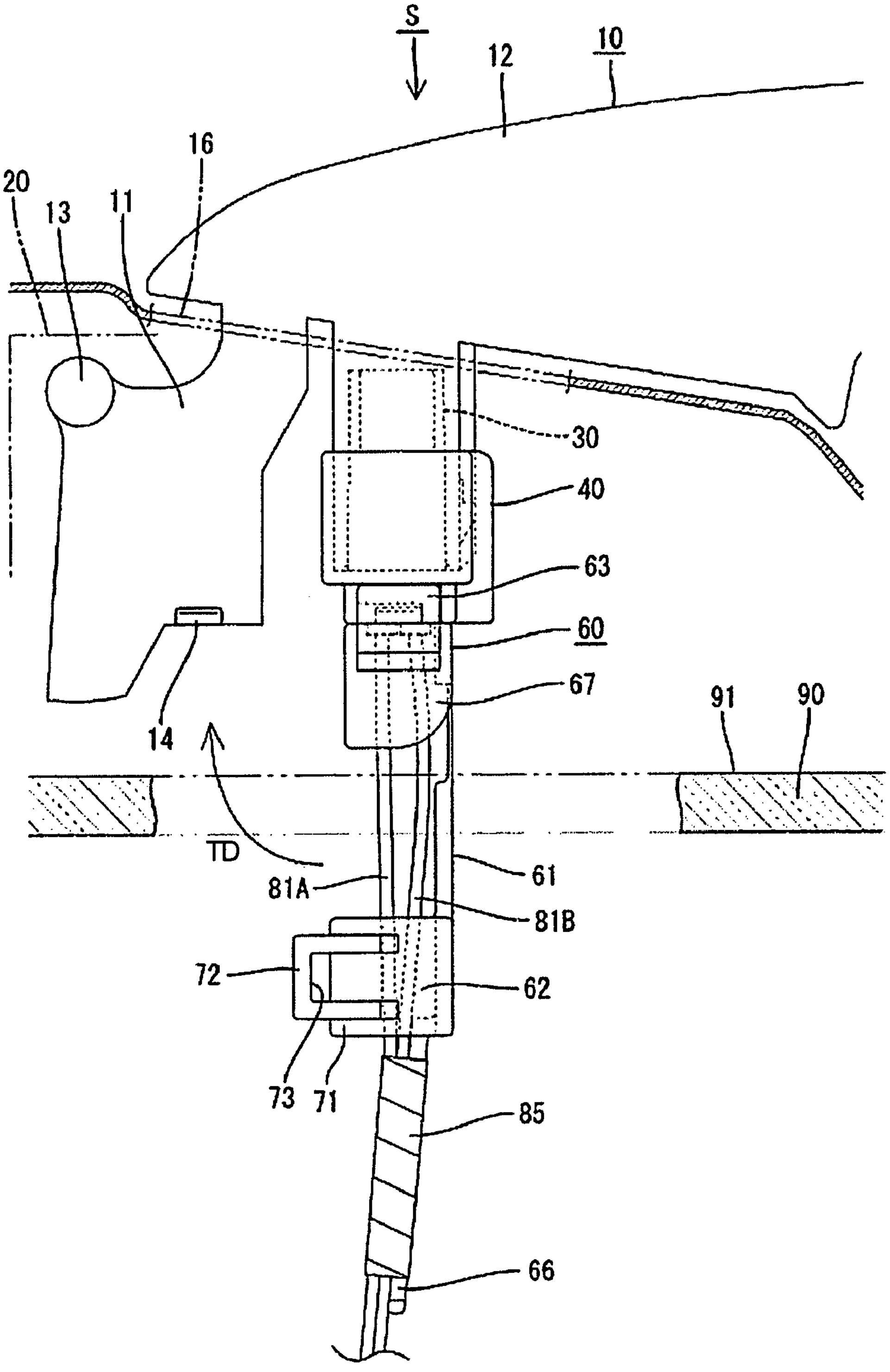
FIG. 2 is a side view showing a state before a wire group and a clamp are bent.

The connector connecting construction is assembled by supporting the handle-side connector 30 on the door handle 10. The handle-side connector 30 and the fulcrum 11 then are introduced through the handle insertion opening 16 of the door handle 10 and into the handle frame 20. The door handle 10 then is hinged to the handle frame 20 via the shaft 13. The frame-side connector 40 connected with the end of the wire group 80 is located pivotally inside the handle frame 20, and the clamp 60 is attached to the frame-side connector 40 from the right in FIG. 2 by sliding the mounting ribs 41 along the mounting grooves 69. A bundling 85, such as tape, a clamp or strip bundling, then is used to bundle the wire group 80 to an intermediate part of the inclined guide 66. Then, as shown in FIG. 2, the handle-side connector 30 and the frame-side connector 40 are connected to bring the connecting surfaces into contact. The terminal fittings in the connectors 30, 40 are connected when the two connectors 30, 40 are connected properly.

In the connected state of the two connectors 30, 40, the wire group 80 drawn out through the end surface of the frame-side connector 40 extends substantially straight along the wire retaining portion 61 without being bent at its intermediate position, as shown in FIG. 2. At this time, the wire 81A that will define an inner side of the bend in the bent state extends substantially straight from the end surface of the frame-side connector 40 to a position by the bundling 85. The wire 81B at an outer side of the bend extends obliquely in from the end surface of the frame-side connector 40 to the bundling position. In other words, the wire 81A at the inner side of the bend is shorter between the end surface of the frame-side connector 40 and the bundling position than the wire 81 B located at the outer side.

The wire retaining portion 61 of the clamp 60 is turned in the turning direction TD indicated by the arrow in FIG. 2 after the two connectors 30, 40 are connected. At this time, the bundling 85 unites the clamp 60 and the wire group 80. Thus, the clamp 60 may be turned by holding the wire group 80. The hinge 64 then is bent about the connector attaching portion 63 to extend substantially along the arcuate edges 67A of the draw-out guiding plates 67. As a result, the handle attaching portion 62 gradually approaches the fulcrum 11 of the door handle 10. The wire group 80 is on the placing surface 61A of the wire retaining portion 61 while the clamp 60 is being turned, and the bend 80B is formed as the hinge 64 is bent. The inclined posture of the inclined portion 80A is defined by the inclined guide 66, and the wires 81 are supported one above the other on the placing surface 61A of the wire retaining portion 61. The wire group 80 does not contact the placing surface 61A of the wire retaining portion 61 between the hinge 64 and the inclined guide 66 due to the step of the inclined guide 66.

The handle attaching portion 62 is turned up to an attached position on the door handle 10. Thus, the handle attaching main bodies 72 engage resiliently with the engaging projections 14 to unite the clamp 60 and the door handle 10 as shown in FIG. 1. In this attached state, the inclined guide 66 supports the inclined portion 80A of the wire group 80 to extend in a direction to widen the clearance to the elevating surface 91 of the door glass 90 toward the leading end. The bend 80B of the wire 81A at the inner side of the bend bulges out a large amount substantially in a U-shape as if covering the wire 81B at the outer side of the bend due to the presence of the incline 80A, but has a compact configuration.

The door handle 10 is turned about the shaft 13 in the inclination direction ID (direction of arrow of FIG. 1) after the clamp 60 is attached to the door handle 10. The handle-side connector 30 then is displaced in the rotating direction ID of the door handle 10. The frame-side connector 40 is connected with the handle-side connector 30 and hence displaces with the handle-side connector 30 in the rotating direction ID of the door handle 10. At this time, the wire group 80 drawn out through the end of the frame-side connector 40 is retained by the wire retaining portion 61 of the clamp 60, and the handle attaching portion 62 of the clamp 60 is attached to the door handle 10 while the wire group 80 is retained by the wire retaining portion 61. Thus, even if the door handle 10 is turned, the relative position of the wire retaining portion 61 to the door handle 10 is fixed. Accordingly, no unnecessary stress acts on the part of the wire group 80 retained by the wire retaining portion 61 from the end surface of the frame-side connector 40 as the door handle 10 is turned. As a result, stresses on the connecting surfaces of the two connectors 30, 40 in directions of displacement are suppressed and the two connectors 30, 40 are displaced smoothly as the door handle 10 is turned.

The elevating surface 91 of the door glass 90 is at the side of the frame-side connector 40 opposite the door handle 10. Thus, the wire group 80 drawn out through the end of the frame-side connector 40 could interfere with the door glass 90. However, the wire group 80 has the inclined portion 80A arranged oblique to the elevating surface 91 of the door glass 90 and widens the clearance to the elevating surface 91 along a direction away from the end surface of the frame-side connector 40. The inclined posture of the inclined portion 80A is supported stably from below by the inclined guide 66 of the clamp 60. Therefore, the wire group 80 will not interfere with the door glass 90.

The wire 81A at the inner side of the bend is bent at the bend 80B and bulges out for length adjustment because of the presence of the inclined portion 80A. This might result in an excessive bending stress and difficulty in being spatially accommodated. However, the wire 81A at the inner side of the bend is shorter between the end surface of the frame-side connector 40 and the bundling position than the wire 81B at the outer side of the bend. Thus, the bulging-out length at the bend 80B of the wire 81A at the inner side of the bend can be shorter. As a result, an unnecessarily large bending stress at this position is prevented and the wire group 80 has a compact configuration.

The extending direction of the wire group 80 can be defined by turning the wire retaining portion 61 about the connector attaching portion 63 with the wire group 80 arranged along the placing surface 61A of the wire retaining portion 61. Thus, the wire group 80 can be bent easily and kept stably bent. Further, the draw-out end of the wire group 80 is covered and protected by the wire retaining portion 61 and the connector attaching portion 63.

A second embodiment of the invention is illustrated in FIGS. 6 to 9. The second embodiment differs from the first embodiment in the shape of a clamp 60A, but is similar to the first embodiment in other respects. Parts that are the same as or similar to the first embodiment are identified by the same reference numerals and are not described again.

Figure 9:
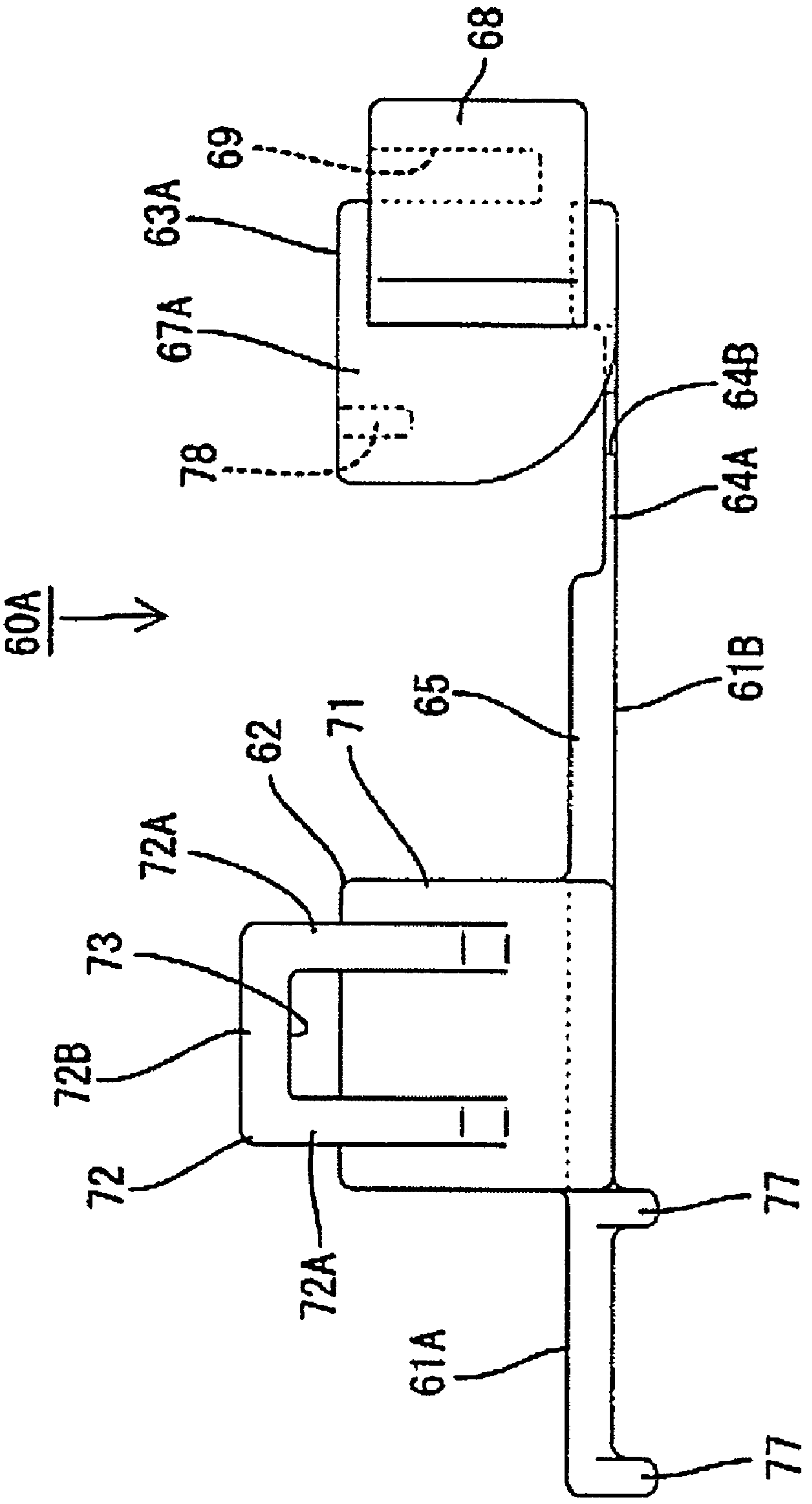
FIG. 9 is a side view of the clamp.

A wire retaining portion 61B is comprised only of a base plate 64 having no inclined guide 66 and extending substantially straight in one direction from a connected position with a connector attaching portion 63A before being bent as shown in FIG. 9. Unlike the first embodiment, there is no technical idea of supporting the wire group 80 in an inclined posture in the second embodiment. Therefore there is no likelihood that the bent portion 80B will bulge out and cannot be accommodated easily. A part of the wire retaining portion 61B located before the connected part with the handle attaching portion 62 is shorter than in the first embodiment. Ribs 77 are formed on the bottom surface of the wire retaining portion 61B opposite to a placing surface 61A for the wire group 80. The ribs 77 extend in the width direction and are spaced apart in forward and backward directions for guiding a finger placing movement. There is no equivalent to the bundling portion 85 near the clamp 60A, and the handle attaching portion 62 has the same shape as in the first embodiment.

Figure 8:
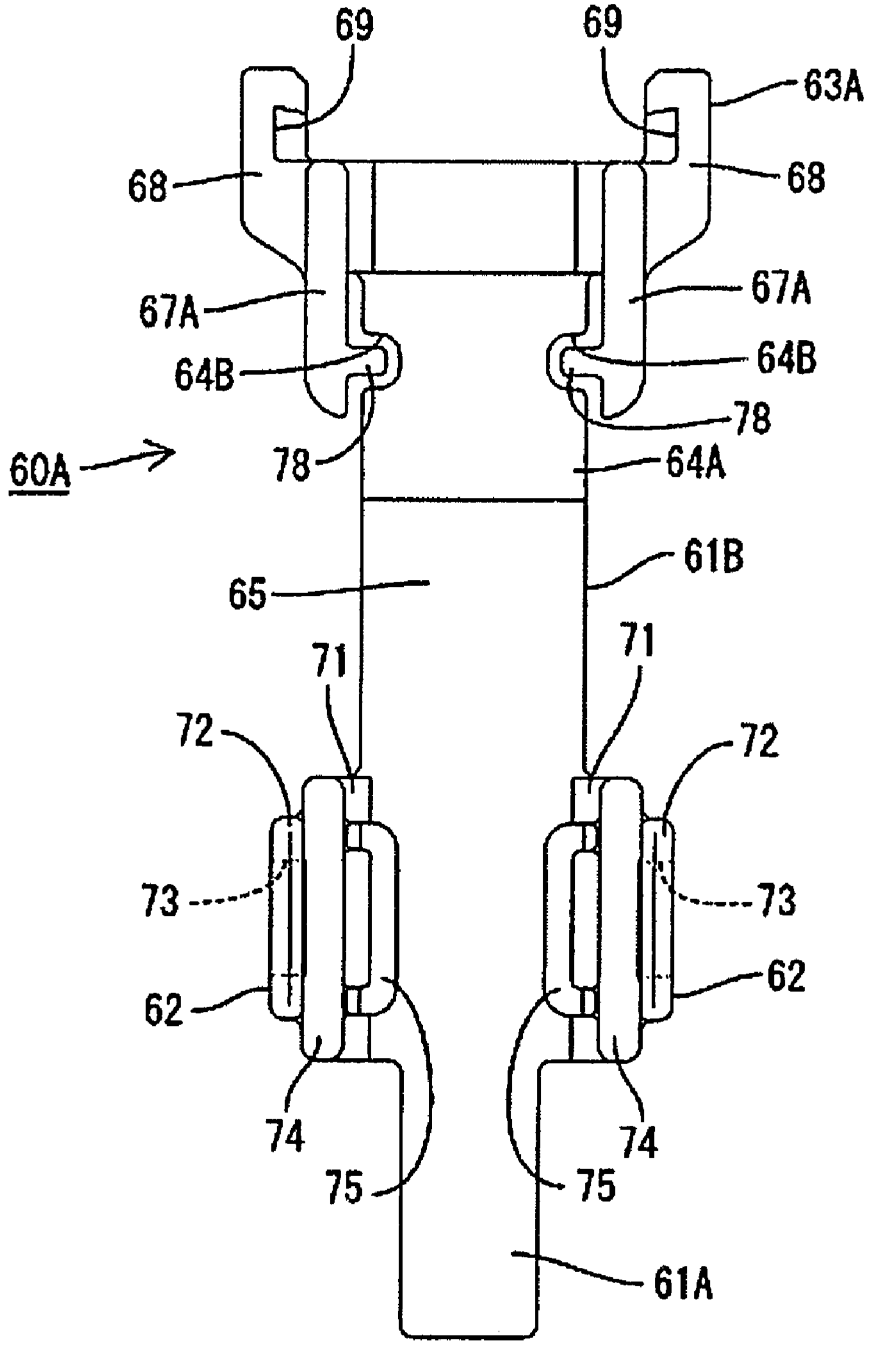
FIG. 8 is a plan view of the clamp.

Draw-out guiding plates 67A of the connector attaching portions 63A are shorter in forward and backward directions than in the first embodiment because the bent portion 80B of the wire group 80 does not bulge out, and left and right drop preventing portions 78 project in near the extending ends of the draw-out guiding plates 67A. The drop preventing portions 78 are long narrow ribs that extend along the extending direction of the draw-out guiding plates 67A, and are transversely symmetrically arranged at the same height on the inner facing surfaces of the draw-out guiding plates 67A. As shown in FIG. 8, cutouts 64B are made at the opposite side edges of a hinge 64A by removing molds for the drop preventing portions 78.

The hinge 64A is bent as the clamp 60A is turned, and the drop preventing portions 78 contact the placing surface 61A of the wire retaining portion 61B in the width direction. Thus, the drop preventing portion 78 holds the hinge 64A stably in the bent posture even though the thinned hinge 64*a* has a lower rigidity.

The invention is not limited to the preceding embodiments, and the following embodiments also are embraced by the scope of the invention as defined by the claims. Various other changes also can be made without departing from the scope of the invention as defined by the claims.

The clamp is attachable to the frame-side connector by the connector attaching portion in the foregoing embodiments. However, the clamp may not be engaged with the frame-side connector without having the connector attaching portion. For example, the clamp may have a wire retaining portion for retaining the wire group drawn out through the end of the frame-side connector at a position distant from the end surface and a handle attaching portion continuous with the wire retaining portion. In short, it is sufficient for the clamp to have an invariable relative position to the door handle by having the handle attaching portion.

Bundling by taping is provided in addition to the clamp in the first embodiment. However, the wire retainer may double as the bundling portion according to the invention to reduce the number of parts.

The wire group extends via the bent portion while facing the elevating surface of the door glass in the foregoing embodiments. However, it may extend without the bent portion while facing the elevating surface of the door glass. In this case, the facing directions of the connecting surfaces of the two connectors may be substantially parallel to the elevating surface of the door glass and/or their connecting direction may be substantially normal to the elevating surface of the door glass.

In the foregoing embodiments, the door handle has the engaging projections and the clamp has the handle attaching main bodies in the form of projecting pieces. Conversely, the door handle may have projecting pieces equivalent to the handle attaching main bodies and the clamp may have engaging projections.

In the foregoing embodiments, the mounting grooves are formed in the connector attaching portion and the mounting ribs are provided on the frame-side connector. Conversely, the connector attaching portion may have mounting ribs and the frame-side connector may have mounting grooves.

The handle frame is separate from the door panel in the foregoing embodiments, but it may be part of the door panel according to the invention.

What is claimed is:

1. A connector connecting construction, comprising:

a handle-side connector to be fixed to a door handle pivoted to a handle frame and displaceable as the door handle is turned;

a frame-side connector to be located at the handle frame for connection with the handle-side connector, and displaceable together with the handle-side connector as the door handle is turned; and at least one clamp including a wire retainer for retaining a wire group drawn through an end of the frame-side connector and at least one handle attaching portion substantially continuous with the wire retainer and attachable to the door handle to make a position of the wire retainer relative to the door handle substantially invariable.

2. The connector connecting construction of claim 1, wherein the wire group includes an inclined portion oblique to an elevating surface of a door glass to widen a clearance to the elevating surface of the door glass along a direction away from the end of the frame-side connector, the wire retainer including a guide for keeping the inclined posture of the inclined portion.

3. The connector connecting construction of claim 2, wherein the end of the frame-side connector faces the elevating surface of the door glass, the wire group being drawn through the end of the frame-side connector and bent, the inclined portion extending from the bend, and has an intermediate part bundled at a bundling position by bundling member, and a wire of the wire group at an inner side of the bend being shorter than a wire at an outer side of the bend.

4. The connector connecting construction of claim 1, wherein the at least one clamp further comprises a connector attaching portion attachable to the frame-side connector, the wire retainer being a strip extending from the connector attaching portion, and an extending direction of the wire group being defined by turning the wire retainer about the connector attaching portion with the wire group arranged along a plate surface of the wire retaining portion.

5. A clamp for use with a handle-side connector that is fixed to a door handle, the door handle being pivotally hinged to a handle frame so that the connector is displaced as the door handle is turned, a frame-side connector being connected with the handle-side connector and being located at the handle frame so that the frame-side connector is displaced together with the handle-side connector, the clamp comprising:

at least one wire retainer for retaining a wire group drawn out through an end surface of the frame-side connector, and at least one handle attaching portion substantially continuous with the wire retainer and attachable to the door handle to make a relative position of the wire retainer to the door handle substantially invariable.

6. The clamp of claim 5, wherein:

the wire group includes an inclined portion arranged oblique to an elevating surface of a door glass to widen a clearance to the elevating surface of the door glass along a direction away from the end of the frame-side connector, and the at least one wire retainer includes at least one guide for keeping the inclined posture of the inclined portion.

7. The clamp of claim 5, further comprising a connector attaching portion attachable to the frame-side connector, wherein the at least one wire retainer is a strip extending from the connector attaching portion, and an extending direction of the wire group is defined by turning the wire retainer about the connector attaching portion with the wire group arranged along a plate surface of the wire retainer.

8. A method of mounting a connector connecting construction, comprising the following steps:

fixing a handle-side connector to a door handle pivotally hinged to a handle frame to be displaceable as the door handle is turned, locating a frame-side connector at the handle frame for connection with the handle-side connector so that the frame-side connector is displaceable with the handle-side connector in its connected state as the door handle is turned, retaining a wire group drawn through an end of the frame-side connector by at least one wire retainer of at least one clamp, and attaching at least one handle attaching portion continuous with the at least one wire retainer to the door handle to make a relative position of the at least one wire retainer to the door handle substantially invariable.

9. The method of claim 8, further comprising:

arranging an inclined portion of the wire group oblique to an elevating surface of a door glass to widen a clearance to the elevating surface along a direction away from the end of the frame-side connector, wherein the wire retainer includes an inclined guide for keeping the inclined posture of the inclined portion.

10. The method of claim 9, further comprising:

arranging the end of the frame-side connector to face the elevating surface of the door glass, bending the wire group after being drawn out through or at the end of the frame-side connector, the inclined portion extending from the bend, and bundling an intermediate part of the wire group at a bundling position by at least one bundling means, and a wire at an inner side of the bend is set shorter than a wire at an outer side of the bend.

* * * * *